(No Model.) 2 Sheets—Sheet 1.
A. H. R. GUILEY.
TROLLEY FOR ELECTRIC RAILWAYS.
No. 486,333. Patented Nov. 15, 1892.
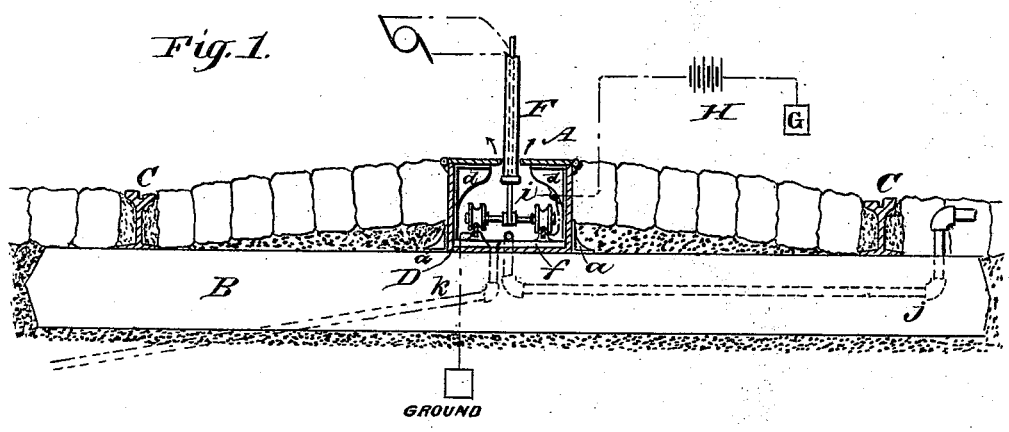
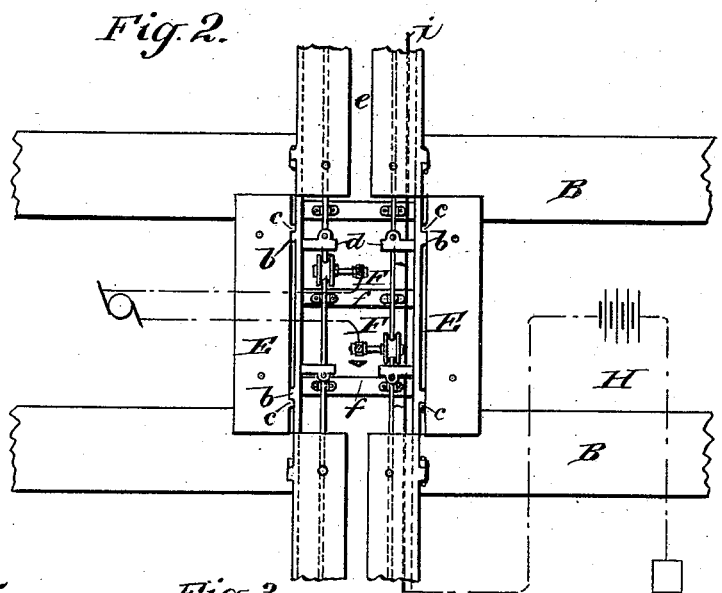
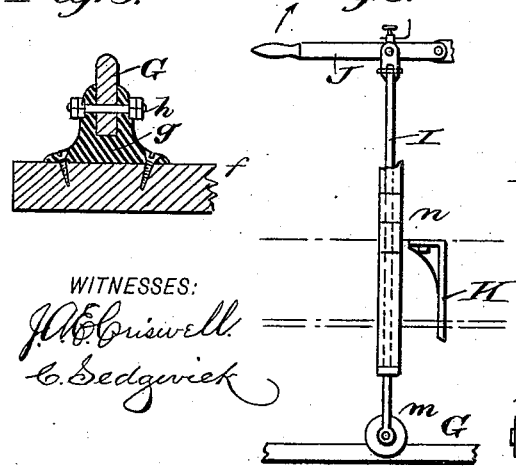
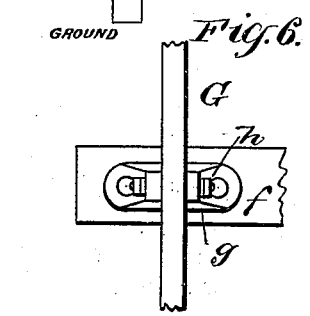
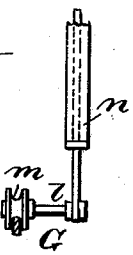
WITNESSES:
J. E. Criswell
C. Sedgwick
INVENTOR:
A. H. R. Guiley
BY
Munn & Co
ATTORNEYS.

(No Model.) 2 Sheets—Sheet 2.
A. H. R. GUILEY.
TROLLEY FOR ELECTRIC RAILWAYS.
No. 486,333. Patented Nov. 15, 1892.
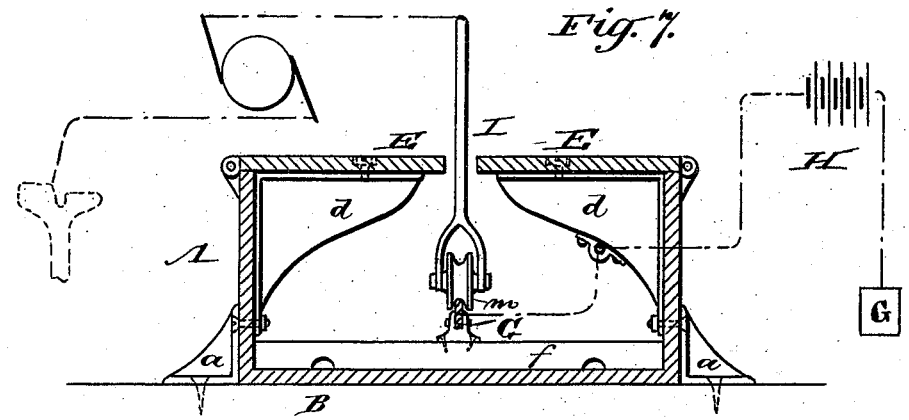
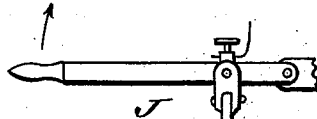
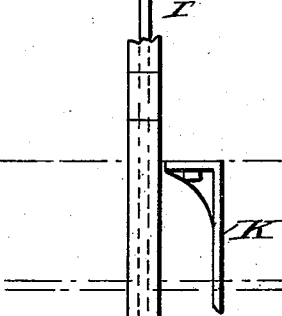
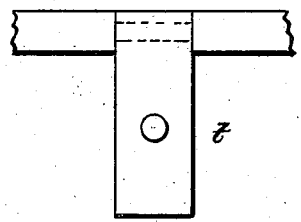
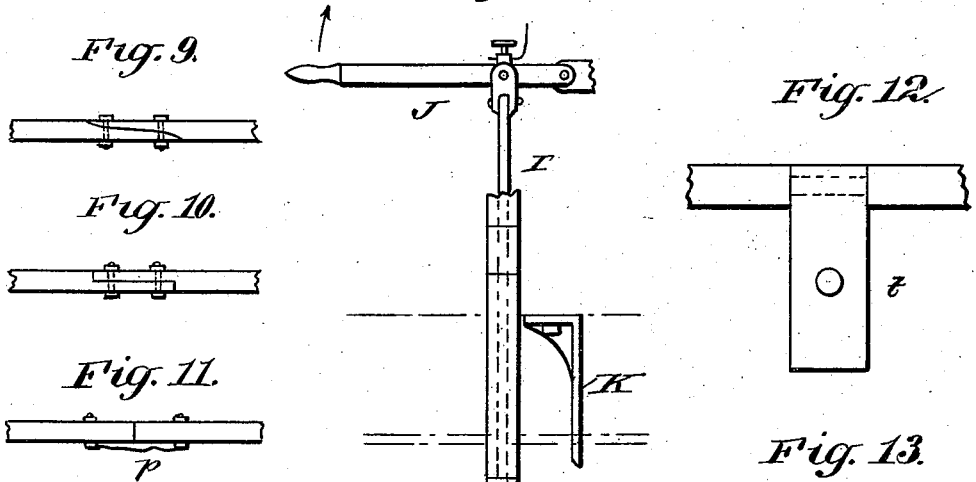
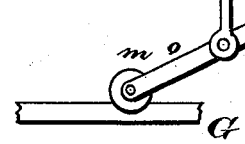
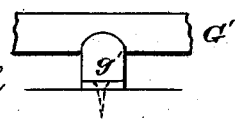
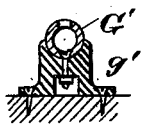
WITNESSES:
INVENTOR:
A. H. R. Guiley
BY Munn & Co.
ATTORNEYS.

UNITED STATES PATENT OFFICE.

AUGUSTUS H. R. GUILEY, OF SOUTH EASTON, PENNSYLVANIA, ASSIGNOR TO HIMSELF AND WILSON B. SOLLIDAY, OF SAME PLACE.

TROLLEY FOR ELECTRIC RAILWAYS.

SPECIFICATION forming part of Letters Patent No. 486,333, dated November 15, 1892.

Application filed December 31, 1891. Serial No. 416,658. (No model.)

*To all whom it may concern:*

Be it known that I, AUGUSTUS H. R. GUILEY, of South Easton, in the county of Northampton and State of Pennsylvania, have invented a new and Improved Electric Railroad or Tramway, of which the following is a specification, reference being had to the annexed drawings, forming a part thereof, in which—

Figure 1 is a transverse section of an electric railroad constructed according to my improvement. Fig. 2 is a partial plan view. Fig. 3 is a side elevation of one of the trolley-rods. Fig. 4 is a front elevation of the same. Fig. 5 is a transverse section of one of the electric conductors or rails. Fig. 6 is a plan view of the same. Fig. 7 is a transverse section of a modified form of my improved conduit and electrical conductor. Fig. 8 is a side elevation of a modified form of the trolley-rod and trolley. Figs. 9, 10, and 11 are detail plan views of the electrical rail or conductor-joint. Fig. 12 is a side elevation, and Fig. 13 an end elevation, of a conductor-support. Fig. 14 is a transverse section of a modified form of the electric rail or conductor, and Fig. 15 is a side elevation, and Fig. 16 a transverse section, of a tubular conductor and its support.

Similar letters of reference indicate corresponding parts in all the views.

The object of my invention is to construct an electrical railway in which the objections to the trolley system will be avoided by placing the conductor or conductors in a conduit below the surface-level, and in which the current will be conveyed from one of the conductors through the motor and returned to the ground or dynamo without rendering any of the connections accessible to pedestrians or animals traveling in the street.

The invention consists in the particular construction and arrangement of parts, as hereinafter described, and pointed out in the claim.

In the present case the conduit A is mounted upon the ties B, which also support the rails C. The conduit is formed of a trough D, made of cast or wrought iron or steel, or of wood or other suitable material. If made of cast or wrought iron or steel it may consist of sections which may be laid successively, being secured to the ties by brackets *a*. Where the rails are laid upon longitudinal timbers or stringers, the sections of the conduit are placed upon a separate support. The sides of the sections of the trough forming the lower part of the conduit are provided at intervals with ears *b*, to which are pivoted ears *c* of the cover sections E, the said pivoted ears forming the hinges of the covers. The lower portion of the conduit is furnished at intervals with brackets *d*, provided with screw-threaded holes for receiving tap-bolts inserted through holes in the cover, the said tap-bolts serving to hold the covers closed so that they will not be opened accidentally, while affording a ready means of releasing the covers and allowing of the inspection or repair of the interior of the conduit. The hinged sections of the cover are made narrower than the body of the conduit, so as to leave a longitudinal slot *e* to admit of the passage of the trolley-rod F. In the bottom of the conduit are secured small slats or ties *f*, of wood or other suitable material, for supporting the electrical rails or conductors. In the present case I have shown a rail G, of conductive material, supported by insulating-chairs *g*, said chairs being secured to the ties *f* by means of screws, as shown in Fig. 5. The rail G is inserted in a slot in the upper part of the chair and secured therein by a transverse bolt *h*. One of the electric rails or conductors is connected at intervals with a conductor *i*, leading from the generator H, so that in case of a breakage of the conductor G or a poor joint the efficiency of the conducting-rail will not be impaired, the electrical supply being distributed to the different portions of the rail by the conductor *i*. The other electric rail G is grounded at intervals, and it may be connected at the end with the generator, so that the current will return to the generator through the rail, or in case of breakage or bad connections it may return through the earth.

Steam-pipes *j*, communicating with the conduit A, extend to the curb or to convenient points where they can be supplied with steam for the purpose of melting any snow or ice that may accumulate in the conduit, and waste-pipes *k* are connected with the bottom of the conduit to carry away the water resulting from the melting of the snow or ice or the water which may find its way into the conduit during a rain-storm.

The trolley used in connection with my improved conduit (shown in Figs. 3 and 4) consists of a rod I, connected with the lever J or other suitable device for applying pressure and extending downward through the bottom of the car into the conduit through the slot $e$. The lower end of the rod I is provided with a stud $l$, extending laterally and carrying a trolley-wheel $m$, which rolls upon the electric rail G. The trolley-rod I is provided with a tube $n$, of insulating material, which is applied to the rod in sections from the upper end as it wears away, the lower section being cut off and replaced by the sections above. To the bottom of the car is attached a metallic arm K, which extends downwardly into the slot $e$ of the conduit and serves to displace any snow or ice or other obstruction which may lodge or form in the conduit, so as to relieve the trolley-rod I from any strain which might be caused by contact with said obstructions.

In the form shown in Fig. 7 a single electric rail or conductor only is used, and the motor carried by the car receives its current through this rail or conductor in the manner before described in connection with Figs. 1 and 2; but the motor is grounded through the rail, as indicated by dotted lines in Fig. 7.

In Fig. 8 is shown a modified form of trolley-rod, in which the trolley-wheel $m$ instead of being journaled on a stud projecting from the rod I is journaled on a stud projecting from the spring-pressed lever $o$, pivoted to the trolley-rod, the object being to give the trolley a certain amount of elasticity to enable it to follow the slight irregularities of the electric rail; but the same effect is secured in the trolley shown in Figs. 3 and 4 by applying by hand a yielding pressure to the upper end of the trolley-rod or to the levers attached thereto.

The conductor shown in Fig. 9 is made up of sections connected by a diagonal joint at the ends and secured by bolts. In the one shown in Fig. 10 the ends of the sections of the conductor are halved together and secured by bolts. In the form shown in Fig. 11 the sections of the electric rail are butted together and the electrical connection is insured by a connecting-wire $p$. In Figs. 12 and 13 is shown a support for a conductor, which consists of a clamp $t$, which embraces the sides of the conductor and is itself secured to the ties at the bottom of the conduit.

In the form shown in Fig. 14 the body $g$ of the rail is made of non-conducting material or an inferior conductor provided with a tongue on its upper edge, to which is fitted a longitudinally-grooved conducting-strip $r$, or conductor of copper or other superior conductive material, the said grooved strip being secured in place by rivets or bolts $s$. In Figs. 15 and 16 the conductor G' consists of a tube, which is secured to a chair $g'$ by a bolt inserted in the lower part of the tube and passing through the chair, the upper side of the tube being apertured to allow of the insertion of the bolt.

When it is desired to start a car operated by my improved devices, the trolley is pushed down into contact with the electric rail, and when it is desired to stop the car the trolley is withdrawn from the rail.

Having thus described my invention, I claim as new and desire to secure by Letters Patent—

In an electric railway, a continuous slotted conduit placed at or below the street level, provided with one or more electrical conducting-rails and furnished with sectional hinged covers arranged to open outwardly, one or more trolley-rods provided with sectional insulation, arranged to project from the electric car through the slot of the conduit and provided with trolley-wheels adapted to roll on the electrical conducting-rails, and a hand-lever pivotally connected with the trolley-rod for raising and lowering the trolley-wheels and increasing or diminishing the pressure of the same upon the conductors, substantially as specified.

The foregoing specification of my new and improved electric railways or tramways signed by me this 28th day of December, 1891, in the presence of the below-subscribed witnesses.

AUGUSTUS H. R. GUILEY.

Witnesses:
GEO. M. HOPKINS,
C. SEDGWICK.